United States Patent [19]
Dorf et al.

[11] Patent Number: 4,921,935
[45] Date of Patent: May 1, 1990

[54] PREPARATION OF POLYARYLENE SULPHIDES WITH KETONE OR PINACONE

[75] Inventors: Ernst-Ulrich Dorf; Franz Alfes; Hans-Joachim Traenckner, all of Krefeld, Fed. Rep. of Germany

[73] Assignee: Bayer Aktiengesellschaft, Leverkusen, Fed. Rep. of Germany

[21] Appl. No.: 266,502

[22] Filed: Nov. 3, 1988

[30] Foreign Application Priority Data

Nov. 10, 1987 [DE] Fed. Rep. of Germany ....... 3738142

[51] Int. Cl.$^5$ ............................................. C08G 75/14
[52] U.S. Cl. .................................................... 528/388
[58] Field of Search ......................................... 528/388

[56] References Cited

U.S. PATENT DOCUMENTS 4,490,522 12/1984 Kawabata et al. .................. 528/388
4,698,415 10/1987 Sinclair et al. ...................... 528/388
4,787,712 11/1988 Ostlinning et al. ................. 528/388

Primary Examiner—Harold D. Anderson
Attorney, Agent, or Firm—Connolly and Hutz

[57] ABSTRACT

This invention relates to a process for the preparation of polyarylene sulphides, preferably polyphenylene sulphide (PPS), whose fusion viscosities can be adjusted to specified values, from alkali metal sulphides and polyhalogenated aromatic compounds in a polar solvent in the presence of a ketone or pinacone. The resulting polyarylene sulphides which have specified fusion viscosities are distinguished by high stability of the melt and low chlorine content. They cause little corrosion in the reaction vessels used for their preparation.

12 Claims, No Drawings

PREPARATION OF POLYARYLENE SULPHIDES WITH KETONE OR PINACONE

This invention relates to a process for the preparation of polyarylene sulphides, preferably polyphenylene sulphide (PPS) whose melt viscosities can be adjusted to specified values, from alkali metal sulphides and polyhalogenated aromatic compounds in a polar solvent in the presence of a ketone or pinacone as regulator. The polyarylene sulphides obtained, which have specified melt viscosities, are distinguished by high stability in the fused state and low chlorine content. They cause little corrosion of the reaction vessels used for their preparation.

Polyarylene sulphides and methods for their preparation are known (e.g. U.S. Pat. Nos. 2,513,188, 3,117,620, 3,354,129). It is also known how to prepare polyarylene sulphides with specified melt viscosities. This may be achieved, for example, by the addition of special monohalogenated aromatic compounds (DE-OS No. 3 529 498), special monomercapto compounds (DE-OS No. 3 529 500), monohalogenated aromatic compounds in combination with monomercapto compounds (DE-OS No. 3 529 501), oligomeric silyl ethers (DE-OS No. 3 541 688) or phenols (DE-OS No. 3 601 215) to the polymerisation reaction.

These processes have various disadvantages, e.g. monomercapto compounds have a very unpleasant odour and are easily oxidized. Oigomeric silyl ethers are expensive so that their use is not always justified. Monochlorinated aromatic compounds and phenols produce the required effect only when used in relatively large quantities (about 1 to 5% by weight).

It was therefore desirable to have effective, inexpensive and stable regulators available.

It has now been found that polyarylene sulphides which are distinguished by high stabilty in the molten state and a low chlorine content and cause little corrosion during processing can be prepared with reproducably adjustable melt viscosities if the polymerisation is carried out in the presence of certain ketones and pinacones. The polyarylene sulphides obtained by this method are characterised, for example, by high melt flow and can be directly processed thermoplastically.

This invention therefore relates to a process for the preparation of optionally branched polyarylene sulphides from (a) 50 to 100 mol % of dihalogenated aromatic compounds corresponding to formula (I)

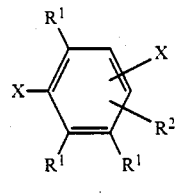

(I)

and 0 to 50 mol % of dihalogenated aromatic compounds corresponding to formula (II)

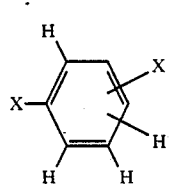

(II)

in which
X stands for halogen atoms such as chlorine or bromine in the meta or para position to one another and
$R^1$ and $R^2$ may be identical or different and may denote hydrogen, $C_1$ to $C_4$ alkylaryl, $C_5$ to $C_{10}$ cycloalkyl, $C_6$ to $C_{10}$ aryl, $C_7$ to $C_{10}$ alkylaryl or $C_7$ to $C_{14}$ arylalkyl and two groups $R^1$ in the ortho position to one another may be joined together to form an aromatic or heterocyclic ring containing up to 3 heteroatoms such as N, O or S, and one of the groups denoted by $R^1$ is always different from hydrogen and (b) 0 to 5 mol %, preferably 0.1 to 2.5 mol %, based on the sum of the dihalogenated aromatic compounds of formulae I and II, of a tri- or tetrahalogenated aromatic compound corresponding to formula (III)

$$ArX_n \qquad (III)$$

wherein
Ar denotes an aromatic $C_6$ to $C_{14}$ group or a heterocyclic group with 5 to 14 ring atoms in which up to 3 ring carbon atoms may be replaced by heteroatoms such as N, O or S,
X stands for a halogen such as chlorine or bromine and
n stands for the number 3 or 4
and (c) 50 to 100 mol % of alkali metal sulphide, preferably sodium or potassium sulphide or mixtures thereof, e.g. in the form of their hydrates or aqueous mixtures, optionally together with small quantities of alkali metal hydroxides such as sodium or potassium hydroxide and from 0 to 50 mol % of alkali metal bisulphide, preferably sodium or potassium hydrogen sulphide or mixtures thereof,
in which the molar ratio of (a+b):c may be in the range of from 0.75:1 to 1.25:1, (d) optionally in the presence of reaction accelerators such as alkali metal carboxylates, alkali metal phosphates, alkali metal phosphonates, alkali metal fluorides or alkali metal alkyl sulphonates or in the presence of N,N-dialkyl carobxylic acid amides, lactams, anhydrides or esters of carboxylic acids in a polar organic solvent, characterised in that from 0.05 to 3% by weight, preferably from 0.05 to 2.5% by weight, based on the quantity of polyarylene sulphide obtained, of one or more ketones corresponding to formula IV and/or one or more pinacones corresponding to formula V $$R^1-C(O)-R^2 \qquad (IV)$$

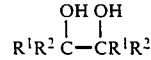

(V)

in which $R^1$ and $R^2$ stand for $C_1$ to $C_{10}$ alkyl and $C_6$ to $C_{24}$ aryl are added to the reaction mixture.

The alkali metal sulphides may be used in the form of their hydrates and aqueous mixtures or aqueous solutions and may be obtained, for example, from $H_2S$ and alkali metal hydroxides.

Certain proportions of alkali metal hydroxide may also be added, depending on the proportion of alkali metal hydrogen sulphide present as impurity in the alkali metal sulphide of the reaction solution. If desired, compounds which split off or form alkali metal hydroxides under the reaction conditions may be used instead of the alkali metal hydroxides as such.

Dehydration of the reaction mixture may be partial but is preferably complete. The water present in the reaction mixture is removed therefrom by distillation, either directly or with the aid of azeotropic formers. The compounds used to form the azeotropic mixture are preferably the dihalogenated aromatic compounds themselves. Dehydration may be carried out by mixing all the components for the reaction together and then dehydrating the whole reaction mixture. Alternatively, the alkali metal sulphide may be dehydrated separately with a proportion of the reactants or on its own.

In one of the possible embodiments of the reaction, for example, the reactants and the reaction accelerator or mixture of reaction accelerators are continuously brought together in the presence of the polar solvent and the water is removed at the same time. When this method is employed, the reaction that sets in can be controlled by the rate at which the components are introduced. It is thereby possible to prevent the water from staying too long in the reaction mixture.

Anhydrous alkali metal sulphides and hydrogen sulphides may also be used. These may have been obtained, for example, by a previous step of dehydration. The sulphides may be introduced into the reaction vessel at the very beginning or they may be introduced at any time during the reaction.

When complete dehydration is to be carried out or when anhydrous alkali metal sulphides or hydrogen sulphides are used, the reaction may be carried out pressure free or at a low pressure of up to about 3 bar. For obtaining reaction temperatures above the boiling point of the solvent or of the mixture of solvent and di- and poly-halogenated aromatic compounds, an elevated pressure of up to 50 bar may be employed.

The reaction may be carried out continuously or discontinuosly. The reaction time may vary widely, and may range from 1 to 48 hours, preferably from 1 to 18 hours. The reaction temperatures are in the range of from 150° to 300° C., preferably from 170° to 280° C.

If branched polyarylene sulphides are to be prepared, at least 0.05 mol % of a tri- or tetrahalogenated aromatic compound of formula (III) should be used.

Addition of the ketone or ketones of formula (IV) and/or of the pinacone or pinacones of formula (V) may be carried out by various methods. For example, these compounds may be introduced into the reaction vessel at the beginning or they may be continuously added during the reaction or the after-condensation time. They may also be added to the reaction phase or after-stirring phase at certain intervals or introduced portion wise. Mixtures of the ketones of formula (IV and/or pinacones of formula (V) may be used.

The following are examples of dihalogenated aromatic compounds of formula (I) to be used according to the invention: p-dichlorobenzene, p-dibromobenzene, 1-chloro-4-bromobenzene, 1,3-dichlorobenzene, 1,3-dibromobenzene and 1-chloro-3-bromobenzene. They may be used singly or as mixtures. 1,4-dichlorobenzene and/or 1,4-dibromobenzene are particularly preferred.

The following are examples of dihalogenated aromatic compounds of formula (II) to be used according to the invention: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,4-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-toluene-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They may be used singly or as mixtures.

The following are examples of trihalogenated or tetrahalogenated aromatic compounds of formula (III) to be used acccording to the invention: 1,2,3-trichlorobenzene, 1,2,4-trichlorobenzene, 1,3,5-trichlorobenzene, 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobisphenyl and 1,3,5-trichlorotriazine.

Any polar solvent which provides sufficient solubility for the organic and optionally inorganic reactants under the reaction conditions may generally be used but N-alkyl lactams are preferred.

The N-alkyl lactams used are those of amino acids having 3 to 11 carbon atoms optionally carrying substituents on the carbon structure which are inert under the reaction conditions.

The following are examples of N-aklyl lactams used: N-methyl caprolactam, N-ethyl caprolactam, N-isopropyl caprolactam, N-isobutyl caprolactam, N-propyl caprolactam, N-butyl caprolactam, N-cyclohexyl caprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone, N-methyl-3-ethyl-2-piperidone, etc. They may be used singly or as mixtures.

The following are examples of ketones which may be used according to the invention: acetophenone, benzophenone, cyclohexylmethylketone, propiophenone, pivalophenone, etc. They may be used singly or as mixtures.

The following are examples of pinacones which may be used according to the invention: tetraphenylethylene glycol, 2,3-diphenylbutane-2,3-diol, 3,4-diphenylhexane-3,4-diol, pinacol, etc. They may be used singly or as mixtures.

The reaction may in addition be carried out in the presence of conventional reaction accelerators, e.g. in the presence of alkali metal carboxylates (DE-AS No. 2 453 749), lithium halides or alkali metal carboxylates (DE-OS No. 2 623 362), lithium chloride or lithium carboxylate (DE-OS No. 2 623 363), alkali metal carbonates in combination with alkali metal carboxylates (U.S. Pat. No. 4,038,259), lithium acetate (DE-OS No. 2 623 333), trialkali metal phosphates (DE-OS No. 2 930 710), trialkali metal phosphonates (DE-OS No. 2 930

797), alkali metal fluorides (DE-OS No. 3 019 732), lithium carbonate (U.S. Pat. No. 4,030,518), amino acids (DE-OS No. 3 428 984), specified quantities of lactam (DE-OS No. 3 428 986) and N,N-dialkylcarboxylic acid amides (DE-OS No. 3 120 538).

Working up of the reaction mixture and isolation of the polyarylene sulphides may be carried out by known methods.

The polyarylene sulphide may be separated from the reaction solution by the usual methods such as filtration or centrifuging, either directly or, for example, after the addition of water and/or dilute acids or organic solvents in which the polyarylene sulphides are only slightly soluble. Separation of the polyarylene sulphide is generally followed by washing with water. Washing or extraction with other washing liquids may also be carried out, either in addition to or after this washing with water.

The polyarylene sulphide may also be obtained, for example, by removal of the solvent by distillation followed by washing as described above.

The polyarylene sulphides prepared according to the invention are distinguished by their clearly defined melt viscosities which can be reproduced with considerable accuracy. This is very important when polyarylene sulphides are to be processed as polymer melts with different flow properties. These must be adapted to the particular use prupose. Thus, for example, the production of films and fibres may require an adjustment to higher fusion viscosities then the production of injection moulded products reinforced with glass fibres or glass/mineral fibres. Products which have a high melt flow but can still be processed thermoplastically may be suitable, for example, for the production of complicated moulded parts and for encapsulating electronic components.

Another advantage of the polyarylene sulphides prepared according to the invention is, for example, their very great stability when subjected to severe temperature conditions. This is advantageous for thermoplastic processing. In addition, the waste recovered from thermoplastic processing can be reused.

The chlorine content of the polymers prepared according to the invention is very low. The polymers produced exude virtually no acid gases and in addition, for example, have a high electric breakdown voltage and tracking resistance.

When molten PPS is processed thermoplastically or brought into contact with metal surfaces it is generally observed to cause corrosion which results in impurities in the PPS and wear of the processing machines. In the process according to the invention, this corrosion is reduced even under severe thermal conditions.

The polyarylene sulphides prepared according to the invention may be mixed with other polymers such as pigments and with fillers, for example graphite, metal powder, glass powder, quartz powder, glass fibres, carbon fibres, etc. and they may be mixed with the usual additives for polyarylene sulphides, such as conventional stabilizers or mould release agents.

The melt flow of polyarylene sulphides is generally determined according to ASTM 1238-70 at 316° C., using a 5 kg weight, and the result is given in g/10 min. When the melt flow values are high, however, this method may cause difficulties owing to the high outflow rate of the polymer melt. The melt viscosity $\eta_m$ of the polymer melt (in Pa.s) has therefore been determined in dependence upon the shear stress (in Pa) by means of the Instron Rotation Viscosimeter at 306° C.

This enables the melt viscosity to be determined over the very wide range of from $10^1$ to $10^7$ Pa.s. In the instron Rheometer, the polymer is melted between a fixed plate and a rotatable cone and the melt viscosity in dependence upon the shear stress can then be calculated from the angular velocity and the data of the apparatus. The apparatus used was a Rheometer Model 3250 of Instron, diameter of cone and plate 2 cm. The result is given as the melt viscosity determined at a shear stress of $\tau = 10^2$ Pa.

After isolation from the reaction mixture, the polyarylene sulphides prepared according to the invention have melt viscosities of from 0.1 to $5 \times 10^2$ Pa.s. They may be worked up in the usual manner, e.g. to films, fibres or, preferably, injection moulded products. These may be used, for example, as motor car parts, mountings and fittings, electric components such as switches, electronic panels, chemically resistant and weather resistant parts and apparatus such as pump housings and pump impellers, etching bath dishes, sealing rings, part of office machinery and telecommunication equipment and household appliances, valves, parts of ball bearings, masses for embedding electronic parts, etc.

EXAMPLE 1

This example describes, for comparison, the preparation of polyphenylene sulphide according to U.S. Pat. No. 3,354,129.

129 g of sodium sulphide hydrate (corresponding to 1 mol of Na$_2$S) and 300 g of N-methyl-2-pyrrolidone were introduced into an autoclave equipped with stirrers. The mixture was flushed with nitrogen and slowly heated to 202° C. A total of 19 ml of water distilled off in the process. The reaction mixture was then cooled to about 160° C. and 147 g of p-dichlorobenzene (=1 mol) in about 50 g of N-methyl-2-pyrrolidone were added. The reaction mixture was then heated to 245° C. under a nitrogen preliminary pressure of 2.5 bar over a period of 30 minutes and kept at this temperature for 3 hours, during which the pressure rose to 14.5 bar. After cooling to room temperature, a grey solid is isolated, which is then carefully washed with water to remove inorganic impurities.

The product was dried in a vacuum at 80° C. and 100.3 g (93%) of poly-p-phenylene sulphide having a melt viscosity of $\eta_m = 4.5$ Pa.s (determined at $10^2$ Pa and 306° C.) were obtained.

The total chlorine content was 0.56% (determined by Wickbold combustion). The product could not be immediately processed thermoplastically.

EXAMPLES 2 TO 7

A melt of 813.9 g of sodium sulphide hydrate (60% sodium sulphide), 100 g of water, 8.1 g of 45% sodium hydroxide solution, 68.0 g of ε-caprolactam and 74.0 g of sodium acetate is added dropwise to 1850.5 g of N-methyl caprolactam and 882.0 g of p-dichlorobenzene in a 4 liter reactor at temperatures above 210° C. over a period of 2 hours while water is continuously removed, and at the same time varying quantities of tetraphenyl ethylene glycol (see table) always made up to 100 g with N-methyl caprolactam are added from a separate dropping funnel. Following an after-reaction tiem of 13 hours at 230° to 235° C., the hot reaction mixture is filtered through a pressure filter and precipitated in water. The precipitated mash is then adjusted to an acid pH, suction filtered, washed successively with water, twice with methylene chloride and again with water and dried in a vacuum at 80° C.

EXAMPLES 8 TO 11

A melt of 1147.5 g of sodium sulphide hydrate (60% sodium sulphide), 325 g of water, 4.3 of sodium hydroxide and 141.2 g of ε-caprolactam is added dropwise to 2699.7 g of N-methyl caprolactam, 1223.1 g of p-dichlorobenzene and varying quantities of benzophenone (see table) in a 5 liter reactor at temperatures in the region of 215° C. over a period of 4 hours and water is continuously removed at the same time. The reaction mixture is then kept under reflux for 9 hours (final temperature about 240° C.). The reaction mixture is precipitated into 40 liters of isopropanol, made acid and filtered. After washing with water to remove the sodium chloride, the product is dried in a vacuum at 80° C.

TABLE

| Example | g of Additive | % by weight of Additive (based on PPS) | % Cl content in PPS (according to Wickbold) | $\eta m$ in Pa·s |
|---|---|---|---|---|
| 1 | — | — | 0.54 | 4.5 |
| Tetraphenylethylene glycol: | | | | |
| 2 | 0.65 | 0.1 | 0.08 | 95 |
| 3 | 0.65 | 0.1 | 0.12 | 105 |
| 4 | 3.25 | 0.5 | 0.11 | 10.2 |
| 5 | 3.25 | 0.5 | 0.16 | 9.0 |
| | | | | 3.0 |
| 7 | 6.50 | 1.0 | 0.11 | 1.2 |
| Benzophenone: | | | | |
| 8 | 0.90 | 0.1 | 0.28 | 8.5 |
| 9 | 4.5C | 0.5 | 0.29 | 0.4 |
| 10 | 22.70 | 2.5 | 0.34 | 0.1 |
| 11 | 22.70 | 2.5 | 0.24 | 0.1 |
| For Comparison | | | | |
| Chlorodiphenyl sulphone: (according to DE-OS 35 29 498, Ex. 2, 3, 6-12) | | | | |
| | 1.2 | | | 145 |
| | 1.8 | | | 80 |
| | 2.3 | | | 63/66 |
| | 3.5 | | | 15/32/45-51 |
| | 4.7 | | | 13 |
| Chlorodiphenyl ether (according to DE-OS 35 29 498, Ex. 5): | | | | |
| | 1.5 | | | 250 |
| Phenol (according to DE-OS 36 01 215, Ex. 1, 3-5): | | | | |
| | 0.4 | | | 210 |
| | 1.4 | | | 45/52 |
| | 2.2 | | | 12 |
| Isooctylphenyl (according to DE-OS 36 01 215, Ex. 6): | | | | |
| | 2.9 | | | 44 |

We claim:

1. Process for the preparation of optionally branched polyarylene sulphides by reaction of the following compounds:

(a) 50 to 100 mol % of dihalogenated aromatic compounds corresponding to formula (I)

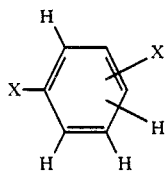
(I)

and 0 to 50 mol % of dihalogenated aromatic compounds corresponding to formula (II)

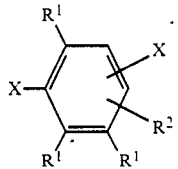
(II)

wherein

X denotes a halogen atom in the meta or para position to one another and $R^1$ and $R^2$ are identical or different and denote hydrogen, $C_1$ to $C_4$ alkylaryl, $C_5$ to $C_{10}$ cycloalkyl, $C_6$ to $C_{10}$ and $C_7$ to $C_{10}$ alkylaryl or $C_7$ to $C_{14}$ arylalkyl or two groups $R^1$ in the ortho position to one another are joined together to form an aromatic or heterocyclic ring containing up to 3 hetero atoms and one of the groups denoted by $R^1$ is always different from hydrogen, (b) 0 to 50 mol %, based on the sum of the dihalogenated aromatic compounds of formulae I and II, of a tri- or tetrahalogenated aromatic compound corresponding to formula (III)

$$ArX_n \qquad (III)$$

wherein

Ar denotes an aromatic $C_6$ to $C_{14}$ group or a heterocyclic group containing 5 to 14 ring atoms in which up to 3 ring carbon atoms are replaced by hetero atoms, X denotes a halogen atom and n denotes the number 3 or 4, and (c) 50 to 100 mol % of alkali metal sulphide or mixtures thereof, optionally together with small quantities of alkali metal hydroxides and from 0 to 50 mol % of alkali metal bisulphide or mixtures thereof, in which the molar ratio of (a+b):c is in the range of from 0.75:1 to 1.25:1, (d) optionally in the presence of reaction accelerators selected from alkali metal carboxylates, alkali metal phosphates, alkali metal phosphonates, alkali metal fluorides or alkali metal alkyl sulphonates or in the presence of N,N-dialkylcarboxylic acid amides, lactams, anhydrides or esters of carboxylic acids in a polar organic solvent, characterised in that from 0.05 to 3% by weight, based on the quantity of polyarylene sulphide obtained, of one or more ketones corresponding to formula (IV) or one or more pinacones corresponding to formula (V)

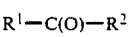
(IV)

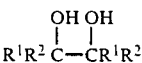
(V)

wherein $R^1$ and $R^2$ stand for $C_1$ to $C_{10}$ alkyl, $C_6$ to $C_{24}$ aryl or mixtures thereof are present during the reaction of said compounds.

2. Process according to claim 1, characterised in that the reactants and the polar organic solvent are mixed singly or as mixtures or solutions at temperatures above 200° C. with simultaneous removal of water and are reacted.

3. Process according to claim 1, characterised in that the reactants and the polar organic solvent are mixed in the anhydrous form, singly or as mixtures or solutions, and reacted at temperatures above 200° C., the components being reacted either before or during the reaction.

4. Process according to claim 1, characterised in that the reaction is carried out in the absence of water.

5. Process according to claim 1, characterised in that benzophenone is used as ketone.

6. Process according to claim 1, characterised in that tetraphenyl ethylene glycol is used as pinacone.

7. Process according to claim 1, wherein the polar solvent is N-alkyl lactam.

8. Process according to claim 1, wherein X is chlorine or bromine.

9. Process according to claim 1, wherein said hetero atoms are N, O or S.

10. Process according to claim 1, wherein the amount of component (b) is 0.1 to 2.5 mol %.

11. Process according to claim 1, wherein the alkali metal sulfide is sodium or potassium sulfide and is used in the form of its hydrate or as an aqueous solution.

12. Process of claim 1, wherein the amount of the ketone, pinacone or mixtures thereof is 0.05 to 2.5% by weight.

* * * * *